(12) United States Patent
Weisbrod et al.

(10) Patent No.: US 11,622,322 B1
(45) Date of Patent: Apr. 4, 2023

(54) SYSTEMS AND METHODS FOR PROVIDING SATELLITE BACKHAUL MANAGEMENT OVER TERRESTRIAL FIBER

(71) Applicant: Verizon Patent and Licensing Inc., Basking Ridge, NJ (US)

(72) Inventors: Fred Weisbrod, Renton, WA (US); Corey J. Christopherson, Bainbridge Island, WA (US); Manuel Bedoya, South Plainfield, NJ (US); James Byron Jones, Plainfield, IL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/513,010

(22) Filed: Oct. 28, 2021

(51) Int. Cl.
*H04W 48/16* (2009.01)
*H04B 7/185* (2006.01)

(52) U.S. Cl.
CPC ........ *H04W 48/16* (2013.01); *H04B 7/18532* (2013.01); *H04B 7/18586* (2013.01)

(58) Field of Classification Search
CPC .............. H04W 48/16; H04B 7/18532; H04B 7/18586
See application file for complete search history.

(56) References Cited

U.S. PATENT DOCUMENTS

2005/0288012 A1* 12/2005 Morgan ................ H04W 88/14
455/13.2

FOREIGN PATENT DOCUMENTS

WO WO-2010133042 A1 * 11/2010 ........... H04L 1/1614

* cited by examiner

*Primary Examiner* — Ayaz R Sheikh
*Assistant Examiner* — Debebe A Asefa

(57) ABSTRACT

A device may receive capacity information associated with a plurality of base stations, and may receive user equipment demands associated with the plurality of base stations. The device may receive, from a satellite, a satellite backhaul demand associated with the satellite, and may calculate excess backhaul capacities associated with the plurality of base stations, based on the user equipment demands and the capacity information. The device may identify a base station, of the plurality of base stations, to provide a satellite backhaul path for the satellite, based on the excess backhaul capacities and the satellite backhaul demand, and may provide, to the base station, a message instructing the base station to activate a satellite antenna associated with the base station. The device may provide, to the satellite, data identifying the base station, and may establish the satellite backhaul path for the satellite, via the base station.

20 Claims, 11 Drawing Sheets

SYSTEMS AND METHODS FOR PROVIDING SATELLITE BACKHAUL MANAGEMENT OVER TERRESTRIAL FIBER

BACKGROUND

An earth station is a terrestrial radio station designed for extraplanetary telecommunication with spacecraft or for reception of radio waves from astronomical radio sources (e.g., satellites).

DETAILED DESCRIPTION OF PREFERRED EMBODIMENTS

Figure 1A:
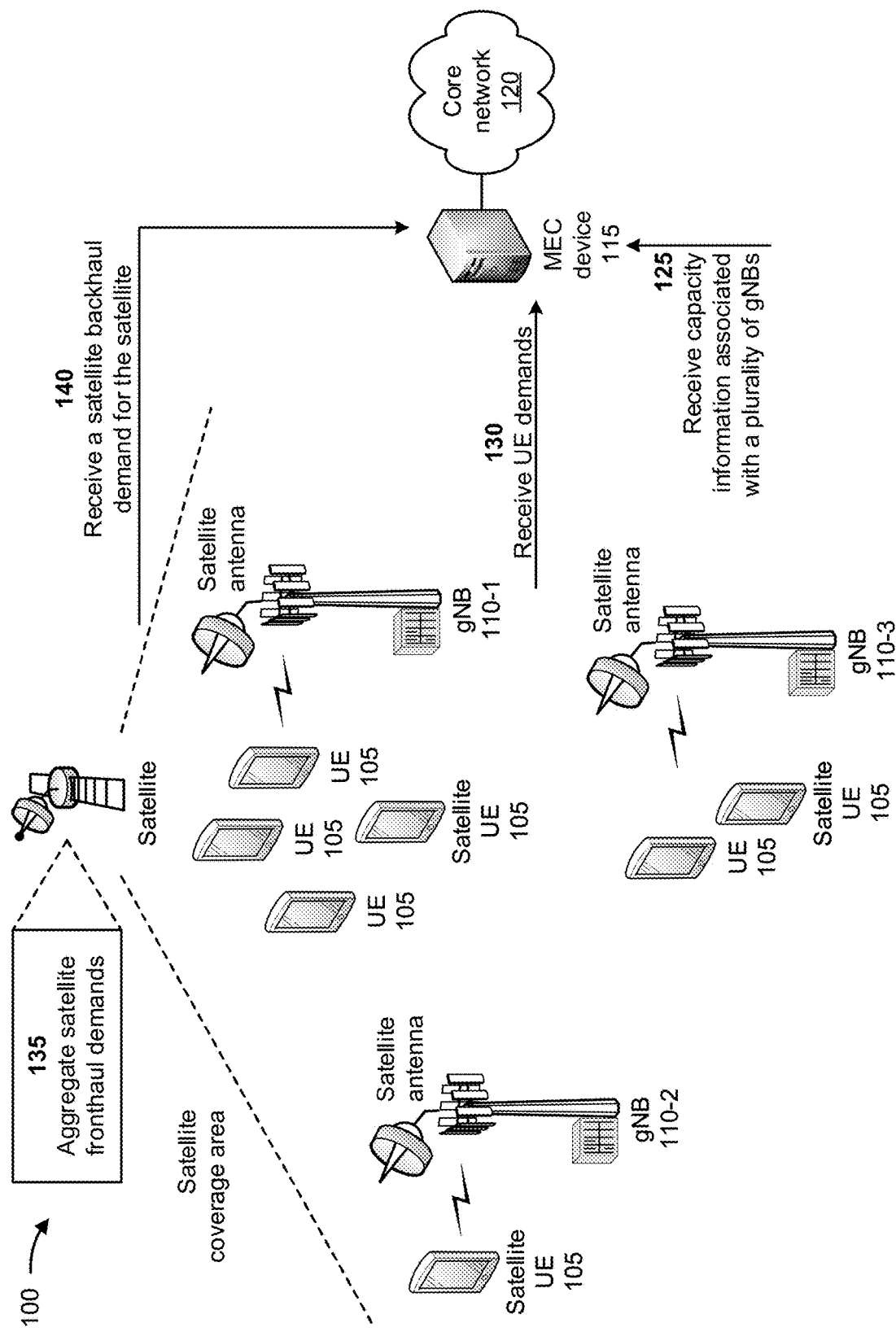
FIGS. 1A-1G are diagrams of one or more example implementations described herein.

The following detailed description of example implementations refers to the accompanying drawings. The same reference numbers in different drawings may identify the same or similar elements.

Low earth orbit (LEO) satellites require numerous earth stations to optimize routing, increase capacity, minimize latency, and/or the like. Earth station builds are complex and expensive, especially due to a lack of high-capacity fiber paths back to a data network (e.g., Internet service providers (ISPs)). Long lead times to lay new fiber paths and build new earth stations may negatively impact performance and adoption of new LEO satellite services. Thus, current techniques for providing satellite services consume computing resources (e.g., processing resources, memory resources, communication resources, and/or the like), networking resources, construction resources, and/or the like associated with failing to provide a sufficient quantity of earth stations to support satellite services, handling traffic congestion in networks due to a lack of satellite services, maintaining satellites unable to communicate with certain networks due to an insufficient quantity of earth stations, and/or the like.

Some implementations described herein provide a device (e.g., a multi-access edge computing (MEC) device) that provides satellite backhaul management over terrestrial fiber. For example, the device may receive capacity information associated with a plurality of base stations, and may receive user equipment (UE) demands associated with the plurality of base stations. The device may receive, from a satellite, a satellite backhaul demand associated with the satellite, and may calculate excess backhaul capacities associated with the plurality of base stations, based on the UE demands and the capacity information. The device may identify a base station, of the plurality of base stations, to provide a satellite backhaul path for the satellite, based on the excess backhaul capacities and the satellite backhaul demand, and may provide, to the base station, a message instructing the base station to activate a satellite antenna associated with the base station. The device may provide, to the satellite, data identifying the base station, and may establish the satellite backhaul path for the satellite, via the base station.

In this way, the device (e.g., the MEC device) provides satellite backhaul management over terrestrial fiber. For example, the MEC device may identify unused capacity on existing fiber connections from cell sites (e.g., base stations or gNodeBs) to a data network, and may selectively activate cell sites, associated with the unused capacity, as earth stations. The MEC device may identify real-time excess fiber capacity associated with a specific cell site. Fiber paths with the excess capacity may be activated as live satellite backhaul connection ground points for satellites within range of the cell site. The MEC device may provide for a region-wide or a nation-wide earth station network to be rapidly and inexpensively deployed. Thus, implementations described herein conserve computing resources, networking resources, and/or the like that would otherwise have been consumed by failing to provide a sufficient quantity of earth stations to support satellite services, handling traffic congestion in networks due to a lack of satellite services, maintaining satellites unable to communicate with certain networks due to an insufficient quantity of earth stations, and/or the like.

FIGS. 1A-1G are diagrams of one or more example implementations 100 described herein. As shown in FIG. 1A, a satellite may be associated with a coverage area that includes multiple UEs 105, multiple gNodeBs (gNBs) 110-1, 110-2, and 110-3 (also referred to herein as gNB 110 or gNBs 110), an MEC device 115, and a core network 120. The satellite may include an astronomical radio source for telecommunication with the earth station. Four UEs 105 may be receiving service from the first gNB 110-1, a single UE 105 may be receiving service from the second gNB 110-2, and two UEs 105 may be receiving service from the third gNB 110-3. Each of the gNBs 110 may include a satellite antenna (e.g., a terrestrial radio station) that provides for extraplanetary telecommunication with the satellite or for reception of radio waves from astronomical radio sources (e.g., the satellite).

Each of the UEs 105 may include a mobile phone, a laptop computer, a tablet computer, a drone, an autonomous vehicle, and/or the like. Each of the gNBs 110 may include a base transceiver station, a radio base station, or similar devices with radio transmitters, antennas, and/or the like. The MEC device 115 may include a device that enables cloud computing capabilities and an information technology service environment at an edge of a network, such as the network depicted in FIG. 1A. The MEC device 115 may enable execution of applications and performance of related processing tasks closer to a network customer (e.g., UEs 105), which may reduce network congestion and improve performance of applications. The core network 120 may include an example architecture of a fifth generation (5G) new radio (NR) core network included in a 5G wireless telecommunications system, and may include physical elements, virtual elements, or a combination of physical and virtual elements. Although implementations are described herein in connection with a 5G NR core network, the implementations may be utilized with other types of core networks, such as a fourth generation (4G) core network. Further details of the UEs 105, the gNBs 110, the MEC device 115, and the core network 120 are provided elsewhere herein.

As further shown in FIG. 1A, and by reference number 125, the MEC device 115 may receive capacity information identifying backhaul capacities associated with the gNBs 110. For example, the MEC device 115 and/or the core network 120 may be associated with a cell site fiber data structure (e.g., a database, a table, a list, and/or the like) that stores the backhaul capacities associated with the gNBs 110. The MEC device 115 may provide, to the data structure, a request for the backhaul capacities associated with the gNBs 110, and the data structure may provide the backhaul capacities associated with the gNBs 110 to the MEC device 115 based on the request. In some implementations, the backhaul capacities associated with the gNBs 110 may include data identifying capacities of fibers associated with the gNBs 110, ownership of the fibers, costs associated with the fibers (e.g., time of day costs, traffic burst costs, and/or the like), geographical coordinates associated with the gNBs 110, fiber types of the fibers (e.g., light fiber, dark fiber, and/or the like), and/or the like.

As further shown in FIG. 1A, and by reference number 130, the MEC device 115 may receive, from the gNBs 110, UE demands identifying demands of the UEs 105 on the gNBs 110. For example, the first gNB 110-1 may provide a first UE demand, indicating that four of the UEs 105 are placing demands on the first gNB 110-1, to the MEC device 115; the second gNB 110-2 may provide a second UE demand, indicating that one UE 105 is placing a demand on the second gNB 110-2, to the MEC device 115; and the third gNB 110-3 may provide a third UE demand, indicating that two of the UEs 105 are placing demands on the third gNB 110-3, to the MEC device 115. In some implementations, the first UE demand, the second UE demand, and/or the third UE demand may be different based on a quantity of the UEs 105 being serviced by the first gNB 110-1, the second gNB 110-2, and the third gNB 110-3, based on configurations of the first gNB 110-1, the second gNB 110-2, and the third gNB 110-3, and/or the like. In some implementations, the UE demands include data identifying throughput volumes of fibers associated with the gNBs 110 and servicing the UEs 105, speeds of the fibers, latencies associated with the fibers, jitters associated with the fibers, availabilities of the fibers, and/or the like. The MEC device 115 may receive the UE demands in real-time, near-real time, and/or the like.

As further shown in FIG. 1A, and by reference number 135, the satellite may aggregate satellite fronthaul demands associated with the satellite. For example, the satellite may receive satellite fronthaul demands from the satellite UEs 105 (e.g., satellite-capable UEs). The satellite may aggregate the satellite fronthaul demands associated with the satellite and may calculate a satellite backhaul demand associated with the satellite based on the aggregation of the satellite fronthaul demands for the satellite UEs 105. In one example, the satellite may be associated with a satellite constellation data structure that stores data identifying satellite backhaul requests associated with the satellite. The satellite may request and receive the data identifying the satellite backhaul requests from the data structure, and may compare the data identifying the satellite backhaul requests and the aggregation of the satellite fronthaul requests. The satellite may determine the satellite backhaul demand (e.g., an aggregation of satellite backhaul demands) associated with the satellite based on comparing the data identifying the satellite backhaul requests (e.g., some of which may be handled by earth stations) and the aggregation of the satellite fronthaul demands. The satellite may provide, to the MEC device 115, the satellite backhaul demand based on the aggregation of the satellite fronthaul demands.

As further shown in FIG. 1A, and by reference number 140, the MEC device 115 may receive the satellite backhaul demand associated with the satellite. For example, the satellite may provide the satellite backhaul demand associated with the satellite (e.g., automatically or based on a request) to the MEC device 115, and the MEC device 115 may receive the satellite backhaul demand associated with the satellite. In some implementations, the MEC device 115 may receive the satellite backhaul demand associated with the satellite in real-time, near-real time, and/or the like.

Figure 1B:
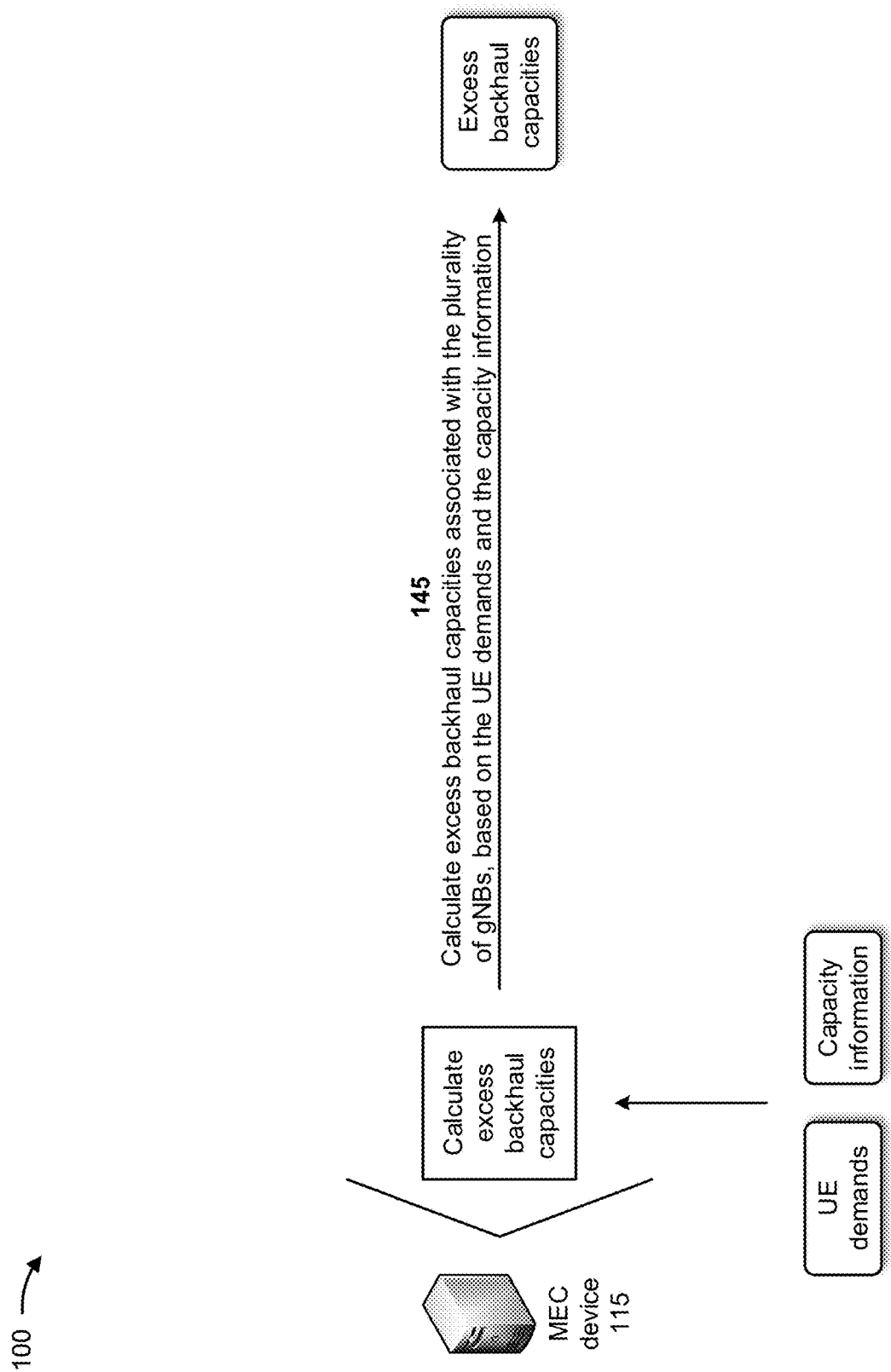

As shown in FIG. 1B, and by reference number 145, the MEC device 115 may calculate excess backhaul capacities associated with the gNBs 110, based on the UE 105 demands and the capacity information. For example, the MEC device 115 may compare the UE demands and the capacity information identifying the backhaul capacities associated with the gNBs 110. The MEC device 115 may calculate the excess backhaul capacities associated with the gNBs 110 based on comparing the UE 105 demands and the backhaul capacities associated with the gNBs 110. In some implementations, the MEC device 115 may process the UE 105 demands, the capacity information, and the satellite backhaul demand, with a machine learning model, to calculate and set thresholds for the excess backhaul capacities associated with the gNBs 110, to modify the thresholds over time, and/or the like. The machine learning model may include one or more of the machine learning models described below in connection with FIG. 2.

Figure 1C:
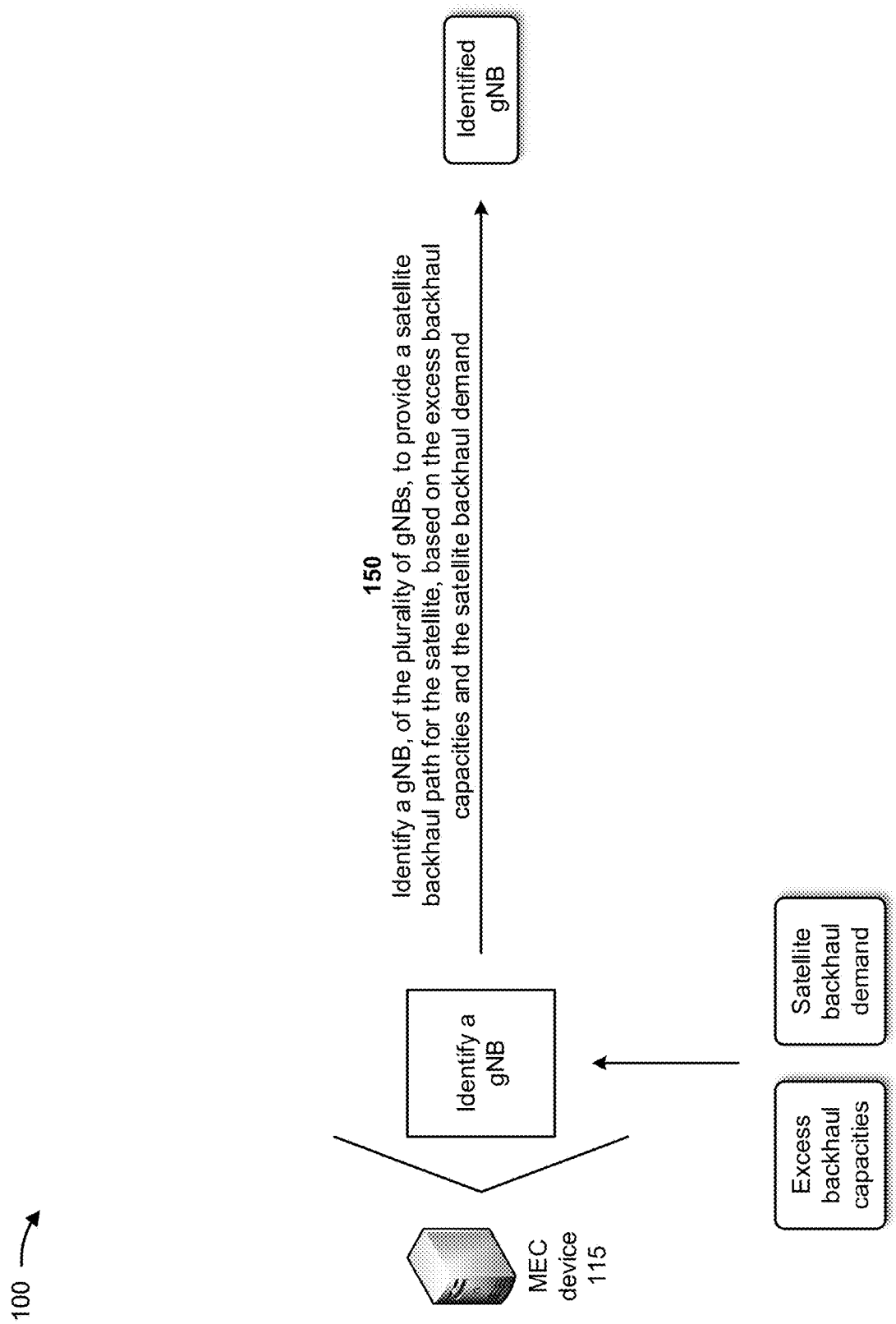

As shown in FIG. 1C, and by reference number 150, the MEC device 115 may identify a gNB 110, of the gNBs 110, to provide a satellite backhaul path for the satellite, based on the excess backhaul capacities associated with the gNBs 110 and the satellite backhaul demand associated with the satellite. For example, the MEC device 115 may compare the excess backhaul capacities associated with the first gNB 110-1, the second gNB 110-2, and the third gNB 110-3 to determine which of the three gNBs 110 may provide a largest excess capacity. As shown in FIG. 1A, since the second gNB 110-2 is only associated with a single UE 105 and the other gNBs 110 are associated with more than one UE 105, the MEC device 115 may determine that the second gNB 110-2 may provide a largest excess capacity for handling the satellite backhaul demand associated with the satellite. Thus, the MEC device 115 may identify the second gNB 110-2 to provide the satellite backhaul path for the satellite.

Figure 1D:
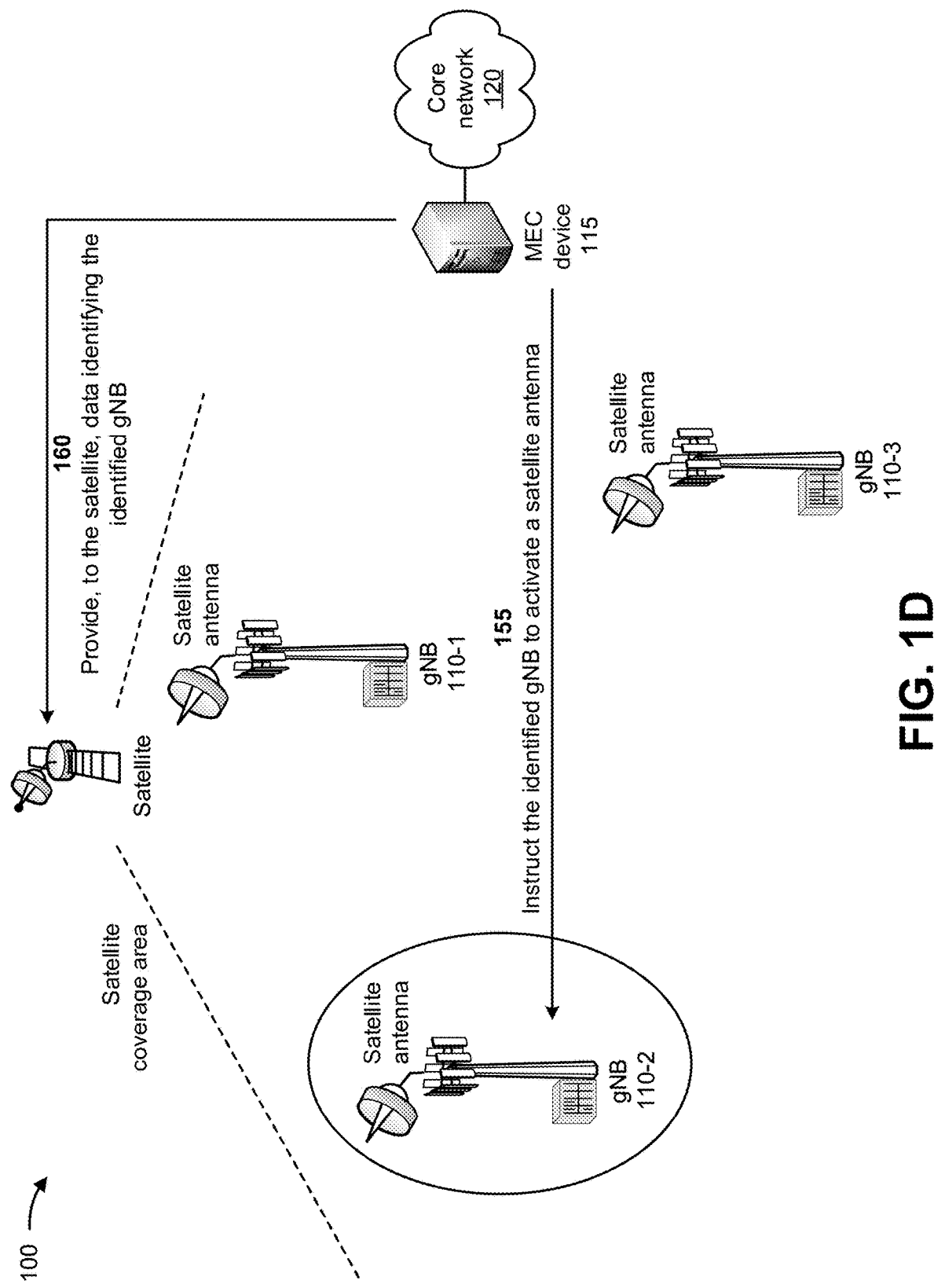

As shown in FIG. 1D, and by reference number 155, the MEC device 115 may instruct the identified gNB 110 (e.g., the second gNB 110-2) to activate a satellite antenna associated with the identified gNB 110. For example, the MEC device 115 may provide, to the identified gNB 110, a message instructing the identified gNB 110 to activate the satellite antenna associated with the identified gNB 110. The identified gNB 110 may receive the message and may activate the satellite antenna so that the identified gNB 110 may communicate with the satellite. In some implementations, the MEC device 115 may communicate with the identified gNB 110 and may control the satellite antenna of the identified gNB 110 via communicating with the identified gNB 110.

As further shown in FIG. 1D, and by reference number 160, the MEC device 115 may provide (via the satellite antenna located at the gNB 110-2), to the satellite, data identifying the identified gNB 110. For example, the MEC device 115 may provide, to the satellite and via the satellite antenna located at the gNB 110-2, data identifying a geographic location of the identified gNB 110, the satellite antenna of the identified gNB 110, an angle of the satellite antenna, and/or the like. The satellite may utilize the data identifying the identified gNB 110 to communicate with the identified gNB 110.

Figure 1E:
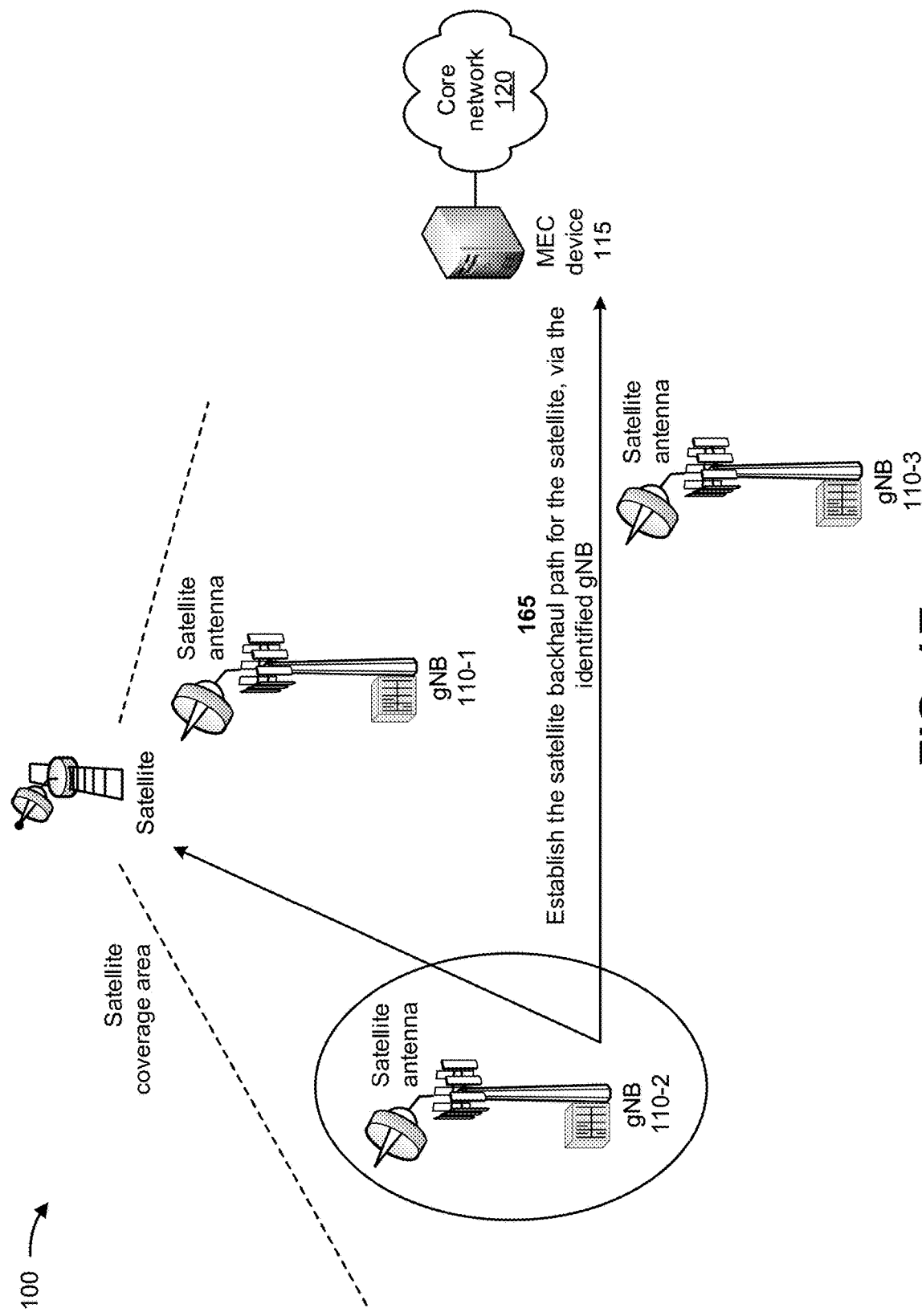

As shown in FIG. 1E, and by reference number 165, the MEC device 115 may establish the satellite backhaul path for the satellite, via the identified gNB 110. For example, based on instructing the identified gNB 110 to activate the satellite antenna associated with the identified gNB 110 and based on providing, to the satellite and via the satellite antenna located at the identified gNB 110, the data identifying the identified gNB 110, the MEC device 115 may cause the satellite to establish the satellite backhaul path to a data network (e.g., associated with the core network 120), via the identified gNB 110. In some implementations, the satellite backhaul path includes one or more fibers connecting the identified gNB 110 to the data network associated with the core network 120.

Figure 1F:
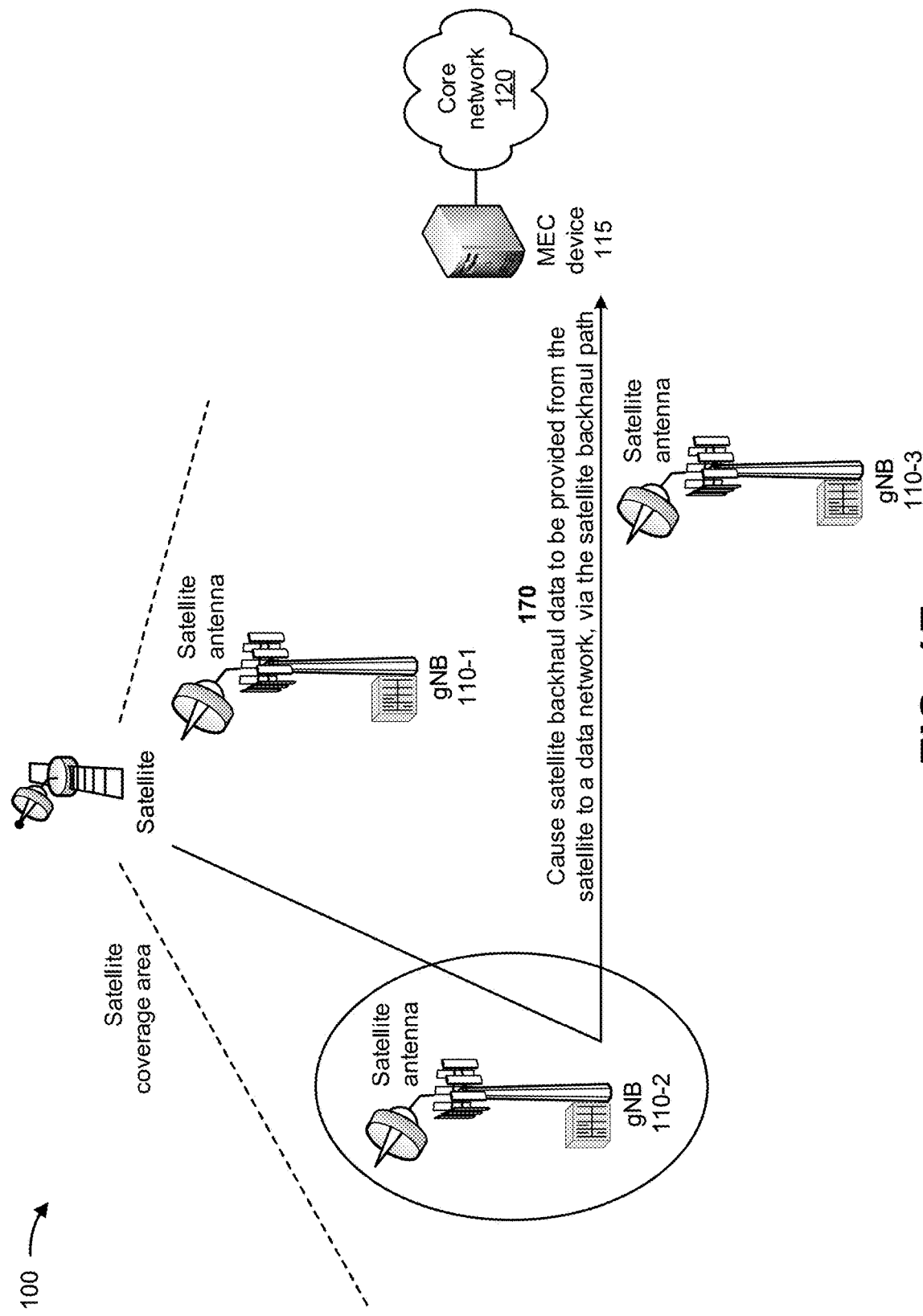

As shown in FIG. 1F, and by reference number 170, the MEC device 115 may cause satellite backhaul data to be provided from the satellite to a data network, via the satellite backhaul path. For example, the satellite may provide the satellite backhaul data to the identified gNB 110, and the identified gNB 110 may provide the satellite backhaul data to the core network 120 (e.g., directly or via the MEC device 115). The core network 120 may provide the satellite backhaul data to the data network associated with the core network 120.

Figure 1G:
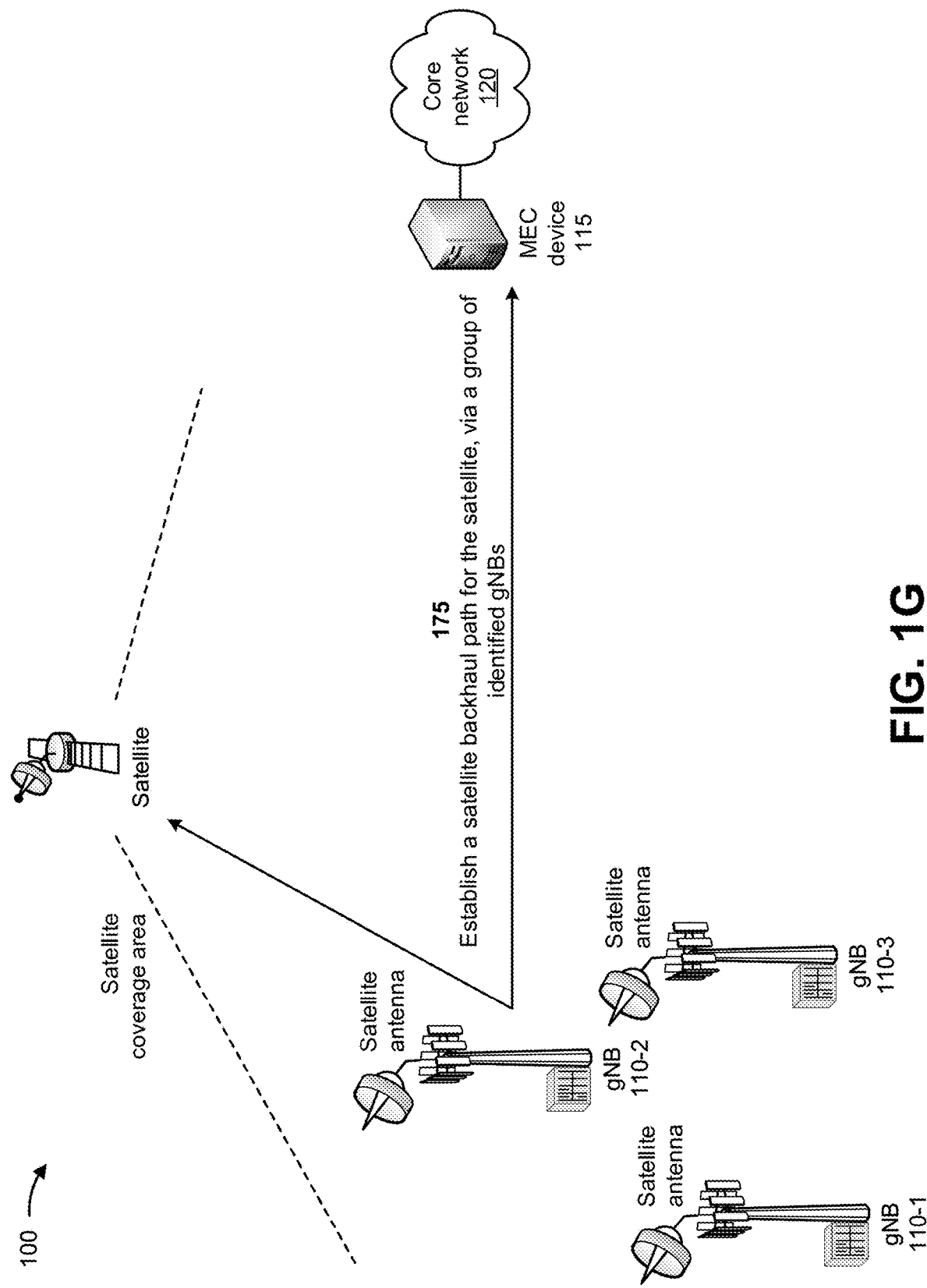

With reference to FIG. 1G, in some implementations, the MEC device 115 may determine that the satellite is in position to communicate with the identified gNB 110, and may manage configuring additional gNBs 110 to handle the traffic as the satellite moves overhead. The MEC device 115 may also determine whether the identified gNB 110 can handle the satellite backhaul demand associated with the satellite. If the identified gNB 110 cannot handle the satellite backhaul demand associated with the satellite, the MEC device 115 may identify two or more gNBs 110 (e.g., a group of gNBs 110) capable of handling the satellite backhaul demand associated with the satellite. In such implementations, the MEC device 115 may provide, to the two or more gNBs 110, messages instructing the two or more gNBs 110 to activate satellite antennas associated with the two or more gNBs 110, and may provide, to the satellite and via satellite antennas located at the two or more gNBs 110, data identifying the two or more gNBs 110.

As shown in FIG. 1G, and by reference number 175, the MEC device 115 may then establish a satellite backhaul path for the satellite, via the two or more gNBs 110. The MEC device 115 may cause satellite backhaul data to be provided from the satellite to a data network, via the satellite backhaul path, based on establishing the satellite backhaul path for the satellite, and may control the satellite antennas associated with the two or more gNBs 110 and communication between the two or more gNBs 110. In such implementations, the two or more gNBs 110 may function as a single satellite antenna for connectivity with the satellite. The MEC device 115 may utilize fiber connectivity or radio frequency (RF) mesh networking for satellite backhaul signals from the satellite, and may manage the fiber connectivity or the RF mesh networking.

In this way, the MEC device 115 provides satellite backhaul management over terrestrial fiber. For example, the MEC device 115 may identify unused capacity on existing fiber connections from cell sites (e.g., gNBs 110) to a data network, and may selectively activate cell sites, associated with the unused capacity, as earth stations. The MEC device 115 may identify real-time excess fiber capacity associated with a specific cell site. Fiber paths with the excess capacity may be activated as live satellite backhaul connection ground points for satellites within range of the cell site. The MEC device 115 may provide for a region-wide or a nation-wide earth station network to be rapidly and inexpensively deployed. Thus, implementations described herein conserve computing resources, networking resources, and/or the like that would otherwise have been consumed by failing to provide a sufficient quantity of earth stations to support satellite services, handling traffic congestion in networks due to a lack of satellite services, maintaining satellites unable to communicate with certain networks due to an insufficient quantity of earth stations, and/or the like.

As indicated above, FIGS. 1A-1G are provided merely as examples. Other examples may differ from what was described with regard to FIGS. 1A-1G. The number and arrangement of devices and networks shown in FIGS. 1A-1G are provided as an example. In practice, there may be additional devices and/or networks, fewer devices and/or networks, different devices and/or networks, or differently arranged devices and/or networks than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) of FIGS. 1A-1G may perform one or more functions described as being performed by another set of devices of FIGS. 1A-1G.

Figure 2:
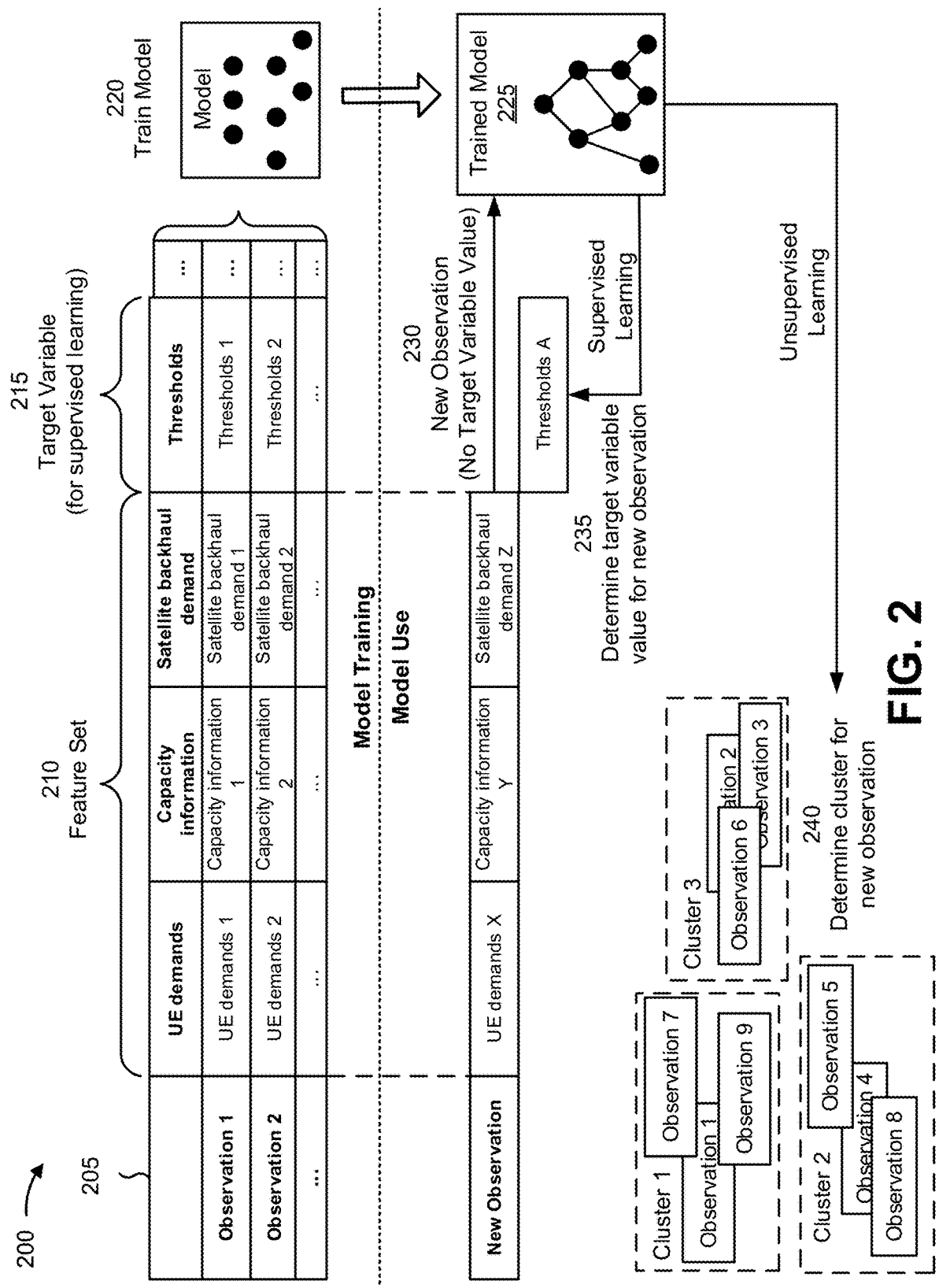
FIG. 2 is a diagram illustrating an example of training and using a machine learning model in connection with providing satellite backhaul management over terrestrial fiber.

FIG. 2 is a diagram illustrating an example 200 of training and using a machine learning model in connection with providing satellite backhaul management over terrestrial fiber. The machine learning model training and usage described herein may be performed using a machine learning system. The machine learning system may include or may be included in a computing device, a server, a cloud computing environment, and/or the like, such as the MEC device 115 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the MEC device 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the MEC device 115. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of UE demands, a second feature of capacity information, a third feature of satellite backhaul demand, and so on. As shown, for a first observation, the first feature may have a value of UE demands 1, the second feature may have a value of capacity information 1, the third feature may have a value of allowed satellite backhaul demand 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is thresholds for the excess backhaul capacities, which has a value of thresholds 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of UE demands X, a second feature of capacity information Y, a third feature of satellite backhaul demand Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of thresholds A for the target variable of the thresholds for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a UE demands cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a capacity information cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to provide satellite backhaul management over terrestrial fiber. The machine learning system enables recognition and/or identification of tens, hundreds, thousands, or millions of features and/or feature values for tens, hundreds, thousands, or millions of observations, thereby increasing accuracy and consistency and reducing delay associated with providing satellite backhaul management over terrestrial fiber relative to requiring computing resources to be allocated for tens, hundreds, or thousands of operators to manually provide satellite backhaul management over terrestrial fiber.

As indicated above, FIG. 2 is provided as an example. Other examples may differ from what is described in connection with FIG. 2.

Figure 3:
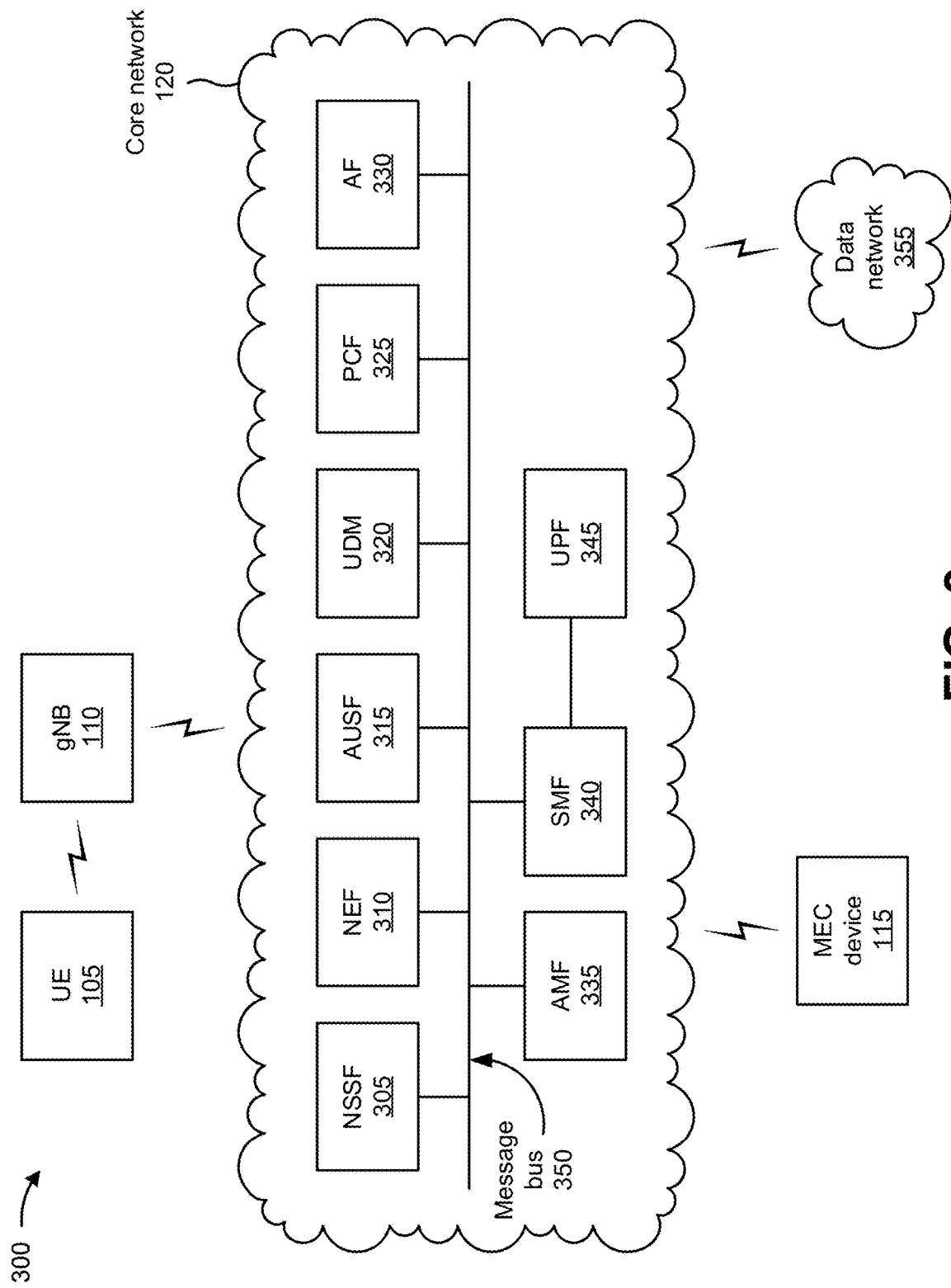
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include the UE 105, the gNB 110, the MEC device 115, and a data network 355. Devices and/or networks of example environment 300 may interconnect via wired connections, wireless connections, or a combination of wired and wireless connections.

The UE 105 includes one or more devices capable of receiving, generating, storing, processing, and/or providing information, such as information described herein. For example, the UE 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

The gNB 110 may support, for example, a cellular radio access technology (RAT). The gNB 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that may support wireless communication for the UE 105. The gNB 110 may transfer traffic between the UE 105 (e.g., using a cellular RAT), one or more base stations (e.g., using a wireless interface or a satellite backhaul interface, such as a wired satellite backhaul interface), and/or the core network 120. The gNB 110 may provide one or more cells that cover geographic areas.

In some implementations, the gNB 110 may perform scheduling and/or resource management for the UE 105 covered by the gNB 110 (e.g., the UE 105 covered by a cell provided by the gNB 110). In some implementations, the gNB 110 may be controlled or coordinated by a network controller, which may perform load balancing, network-level configuration, and/or the like. The network controller may communicate with the gNB 110 via a wireless or wireline satellite backhaul. In some implementations, the gNB 110 may include a network controller, a self-organizing/optimizing network (SON) module or component, or a similar module or component. In other words, the gNB 110 may perform network control, scheduling, and/or network management functions (e.g., for uplink, downlink, and/or sidelink communications of the UE 105 covered by the gNB 110).

The MEC device 115 includes one or more devices capable of receiving, generating, storing, processing, providing, and/or routing information, as described elsewhere herein. The MEC device 115 may include a communication device and/or a computing device. For example, the MEC device 115 may include a server, such as an application server, a client server, a web server, a database server, a host server, a proxy server, a virtual server (e.g., executing on computing hardware), or a server in a cloud computing system. In some implementations, the MEC device 115 includes computing hardware used in a cloud computing environment.

In some implementations, the core network 120 may include an example functional architecture in which systems and/or methods described herein may be implemented. For example, the core network 120 may include an example architecture of a 5G NR core network included in a 5G wireless telecommunications system. While the example architecture of the core network 120 shown in FIG. 3 may be an example of a service-based architecture, in some implementations, the core network 120 may be implemented as a reference-point architecture, a 4G core network, and/or the like.

As shown in FIG. 3, the core network 120 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, a user plane function (UPF) 345, and/or the like. These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

The NSSF 305 includes one or more devices that select network slice instances for the UE 105. By providing network slicing, the NSSF 305 allows an operator to deploy multiple substantially independent end-to-end networks potentially with the same infrastructure. In some implementations, each slice may be customized for different services.

The NEF 310 includes one or more devices that support exposure of capabilities and/or events in the wireless telecommunications system to help other entities in the wireless telecommunications system discover network services.

The AUSF 315 includes one or more devices that act as an authentication server and support the process of authenticating the UE 105 in the wireless telecommunications system.

The UDM 320 includes one or more devices that store user data and profiles in the wireless telecommunications system. The UDM 320 may be used for fixed access, mobile access, and/or the like, in the core network 120.

The PCF 325 includes one or more devices that provide a policy framework that incorporates network slicing, roaming, packet processing, mobility management, and/or the like.

The AF 330 includes one or more devices that support application influence on traffic routing, access to the NEF 310, policy control, and/or the like.

The AMF 335 includes one or more devices that act as a termination point for non-access stratum (NAS) signaling, mobility management, and/or the like.

The SMF 340 includes one or more devices that support the establishment, modification, and release of communication sessions in the wireless telecommunications system. For example, the SMF 340 may configure traffic steering policies at the UPF 345, enforce user equipment IP address allocation and policies, and/or the like.

The UPF 345 includes one or more devices that serve as an anchor point for intraRAT and/or interRAT mobility. The UPF 345 may apply rules to packets, such as rules pertaining to packet routing, traffic reporting, handling user plane QoS, and/or the like.

The message bus 350 represents a communication structure for communication among the functional elements. In other words, the message bus 350 may permit communication between two or more functional elements.

The data network 355 includes one or more wired and/or wireless data networks. For example, the data network 355 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
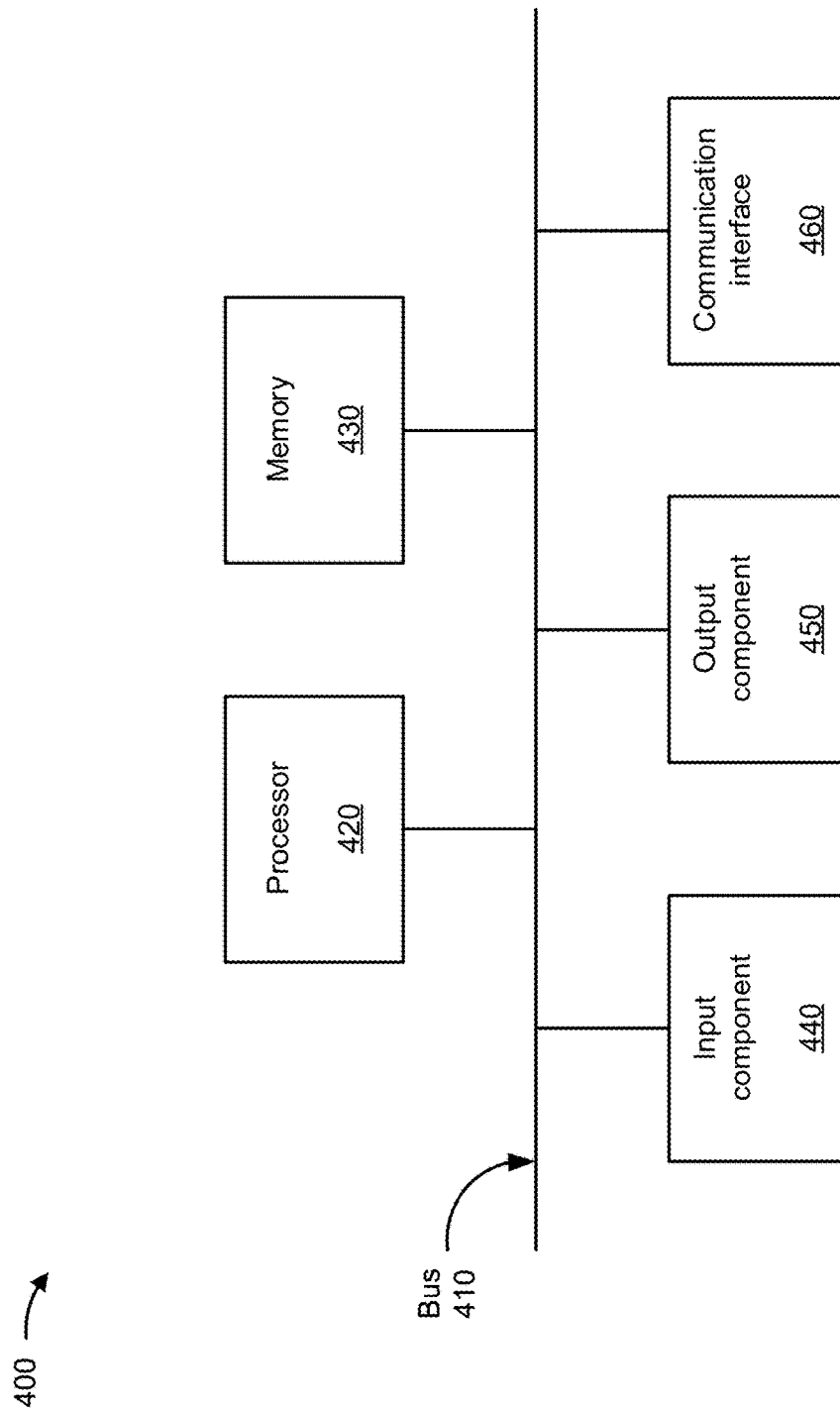
FIG. 4 is a diagram of example components of one or more devices of FIG. 3.

FIG. 4 is a diagram of example components of a device 400. The device 400 may correspond to the UE 105, the gNB 110, the MEC device 115, the NSSF 305, the NEF 310, the AUSF 315, the UDM 320, the PCF 325, the AF 330, the AMF 335, the SMF 340, and/or the UPF 345. In some implementations, the UE 105, the gNB 110, the MEC device 115, the NSSF 305, the NEF 310, the AUSF 315, the UDM 320, the PCF 325, the AF 330, the AMF 335, the SMF 340, and/or the UPF 345 may include one or more devices 400 and/or one or more components of the device 400. As shown in FIG. 4, the device 400 may include a bus 410, a processor 420, a memory 430, an input component 440, an output component 450, and a communication interface 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication interface 460 enables the device 400 to communicate with other devices via a wired connection and/or a wireless connection. For example, the communication interface 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
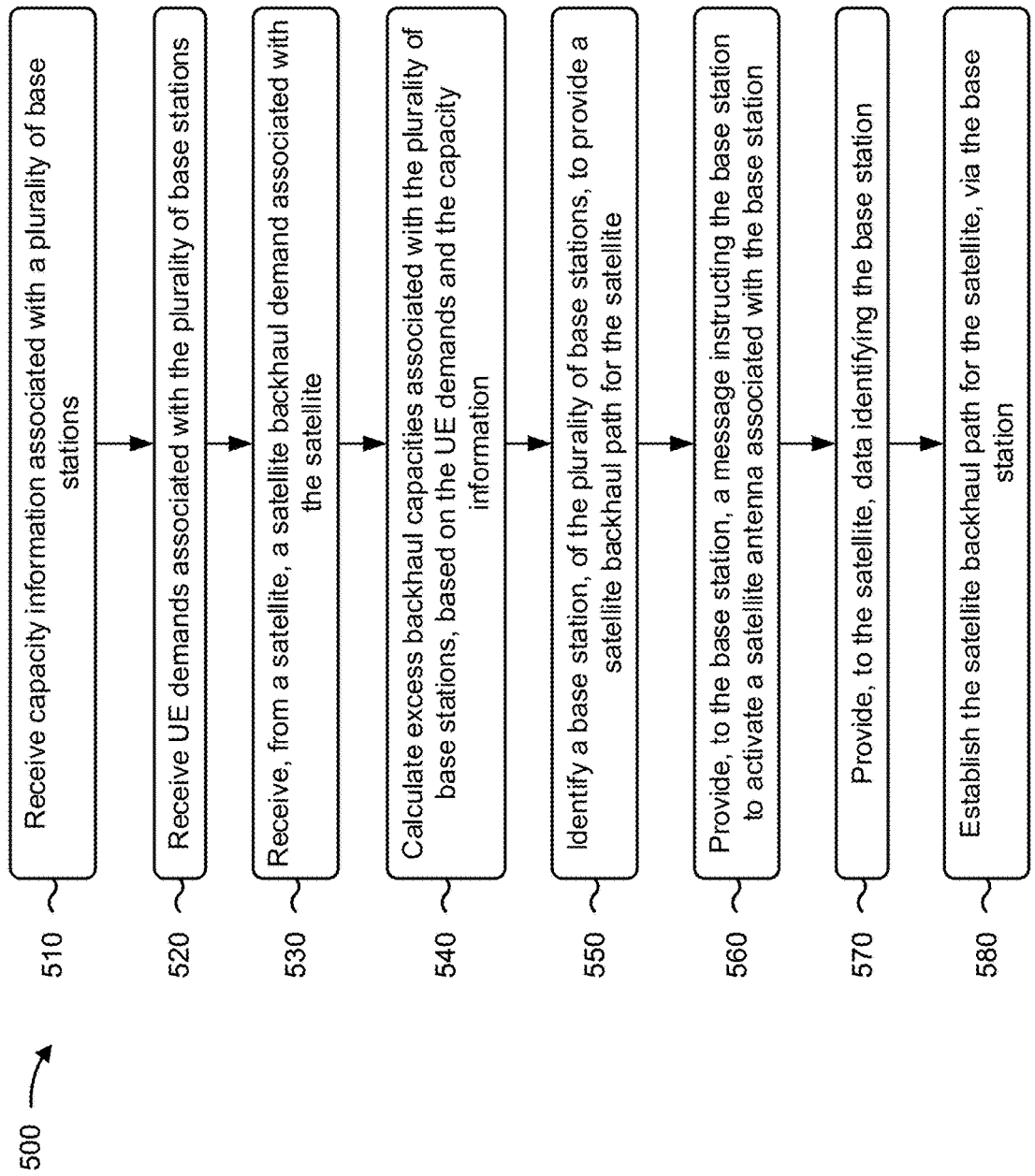
FIG. 5 is a flow chart of an example process for providing satellite backhaul management over terrestrial fiber.

FIG. 5 is a flow chart of an example process 500 for providing satellite backhaul management over terrestrial fiber. In some implementations, one or more process blocks of FIG. 5 may be performed by a device (e.g., the MEC device 115). In some implementations, one or more process blocks of FIG. 5 may be performed by another device or a group of devices separate from or including the device, such as a gNB (e.g., the gNB 110), and/or the like. Additionally, or alternatively, one or more process blocks of FIG. 5 may be performed by one or more components of the device 400, such as the processor 420, the memory 430, the input component 440, the output component 450, and/or the communication interface 460.

As shown in FIG. 5, process 500 may include receiving capacity information associated with a plurality of base stations (block 510). For example, the device may receive capacity information associated with a plurality of base stations, as described above. In some implementations, the capacity information associated with the plurality of base stations includes information identifying one or more of capacities of fibers associated with the plurality of base stations, ownership of the fibers, costs associated with the fibers, geographical coordinates associated with the plurality of base stations, or fiber types of the fibers.

As further shown in FIG. 5, process 500 may include receiving user equipment demands associated with the plurality of base stations (block 520). For example, the device may receive user equipment demands associated with the plurality of base stations, as described above. In some implementations, the user equipment demands associated with the plurality of base stations include data identifying one or more of volumes of fibers associated with the plurality of base stations, speeds of the fibers, latencies associated with the fibers, jitters associated with the fibers, or availabilities of the fibers.

As further shown in FIG. 5, process 500 may include receiving, from a satellite, a satellite backhaul demand associated with the satellite (block 530). For example, the device may receive, from a satellite, a satellite backhaul demand associated with the satellite, as described above. In some implementations, the satellite backhaul demand associated with the satellite is based on an aggregation of satellite fronthaul demands associated with the satellite.

As further shown in FIG. 5, process 500 may include calculating excess backhaul capacities associated with the plurality of base stations, based on the user equipment demands and the capacity information (block 540). For example, the device may calculate excess backhaul capacities associated with the plurality of base stations, based on the user equipment demands and the capacity information, as described above.

As further shown in FIG. 5, process 500 may include identifying a base station, of the plurality of base stations, to provide a satellite backhaul path for the satellite, based on the excess backhaul capacities and the satellite backhaul demand (block 550). For example, the device may identify a base station, of the plurality of base stations, to provide a satellite backhaul path for the satellite, based on the excess backhaul capacities and the satellite backhaul demand, as described above. In some implementations, the satellite backhaul path includes one or more fibers connecting the base station to a data network.

As further shown in FIG. 5, process 500 may include providing, to the base station, a message instructing the base station to activate a satellite antenna associated with the base station (block 560). For example, the device may provide, to the base station, a message instructing the base station to activate a satellite antenna associated with the base station, as described above.

As further shown in FIG. 5, process 500 may include providing, to the satellite, data identifying the base station (block 570). For example, the device may provide, to the satellite, data identifying the base station, as described above.

As further shown in FIG. 5, process 500 may include establishing the satellite backhaul path for the satellite, via the base station (block 580). For example, the device may establish the satellite backhaul path for the satellite, via the base station, as described above.

In some implementations, process 500 includes causing satellite backhaul data to be provided from the satellite to a data network, via the satellite backhaul path, based on establishing the satellite backhaul path for the satellite between the identified gNB and the satellite via the satellite communications antenna.

In some implementations, process 500 includes identifying two or more base stations, of the plurality of base stations, to provide another satellite backhaul path for the satellite, based on the excess backhaul capacities and the satellite backhaul demand, providing, to the two or more base stations, messages instructing the two or more base stations to activate satellite antennas associated with the two or more base stations, providing, to the satellite, data identifying the two or more base stations, and establishing the other satellite backhaul path for the satellite, via the two or more base stations. In some implementations, process 500 includes causing satellite backhaul data to be provided from the satellite to a data network, via the other satellite backhaul path, based on establishing the other satellite backhaul path for the satellite. In some implementations, process 500 includes controlling the satellite antennas associated with the two or more base stations and communication between the two or more base stations.

In some implementations, process 500 includes determining thresholds for the excess backhaul capacities associated with the plurality of base stations based on utilizing a machine learning model with the user equipment demands and the capacity information.

In some implementations, process 500 includes controlling the satellite antenna associated with the base station when establishing the satellite backhaul path for the satellite.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   receiving, by a device and from a satellite, a satellite backhaul demand associated with the satellite;
   receiving, by the device, backhaul capacity information associated with each of a plurality of base stations, wherein none of the plurality of base stations is providing a satellite backhaul path for the satellite when the device receives the backhaul capacity information;
   receiving, by the device, user equipment demands associated with each of the plurality of base stations;
   calculating, by the device, excess backhaul capacities associated with each of the plurality of base stations, based on the user equipment demands and the backhaul capacity information;
   identifying, by the device, a base station, of the plurality of base stations, to provide a satellite backhaul path for the satellite, based on the excess backhaul capacities and the satellite backhaul demand;
   providing, by the device and to the base station, a message instructing the base station to activate a satellite antenna associated with the base station;
   providing, by the device and to the satellite via the satellite antenna, data identifying the base station; and
   establishing, by the device, the satellite backhaul path for the satellite, wherein the satellite backhaul path includes a direct path from the satellite to the base station.

2. The method of claim 1, wherein the satellite backhaul demand associated with the satellite is based on an aggregation of satellite fronthaul demands associated with the satellite.

3. The method of claim 1, wherein the backhaul capacity information associated with the plurality of base stations includes information identifying one or more of:
   capacities of fibers associated with the plurality of base stations,
   ownership of the fibers,
   costs associated with the fibers,
   geographical coordinates associated with the plurality of base stations, or
   fiber types of the fibers.

4. The method of claim 1, further comprising:
   causing satellite backhaul data to be provided from the satellite to a data network, via the satellite backhaul path, based on establishing the satellite backhaul path for the satellite.

5. The method of claim 1, further comprising:
   identifying at least one other base station, of the plurality of base stations, to provide at least one other satellite backhaul path for the satellite, based on the excess backhaul capacities and the satellite backhaul demand;
   providing, to the at least one other base station, at least one message instructing the at least one other base station to activate at least one satellite antenna associated with the at least one other base station;
   providing, to the satellite, data identifying the at least one other base station; and
   establishing at least one other satellite backhaul path for the satellite, via the at least one other base station.

6. The method of claim 5, further comprising:
   causing satellite backhaul data to be provided from the satellite to a data network, via the satellite backhaul path and the at least one other satellite backhaul path, based on establishing the satellite backhaul path and the at least one other satellite backhaul path for the satellite.

7. The method of claim 5, further comprising:
   controlling the satellite antennas associated with the base station and the at least one other base station, and controlling communication between the base station and the at least one other base station.

8. A device, comprising:
   one or more processors configured to:
      receive, from a satellite, a satellite backhaul demand associated with the satellite;
      receive backhaul capacity information associated with a plurality of base stations, wherein none of the plurality of base stations is providing a satellite backhaul path for the satellite when the device receives the backhaul capacity information;
      receive user equipment demands associated with the plurality of base stations;
      calculate excess backhaul capacities associated with the plurality of base stations, based on the user equipment demands and the backhaul capacity information;
      identify a base station, of the plurality of base stations, to provide a satellite backhaul path for the satellite, based on the excess backhaul capacities and the satellite backhaul demand;
      provide, to the base station, a message instructing the base station to activate a satellite antenna associated with the base station;
      provide, to the satellite, data identifying the base station;
      establish the satellite backhaul path for the satellite, wherein the satellite backhaul path includes a direct path from the satellite to the base station; and
      cause satellite backhaul data to be provided from the satellite to a data network, via the satellite backhaul path, based on establishing the satellite backhaul path for the satellite.

9. The device of claim 8, wherein the backhaul capacity information associated with the plurality of base stations includes information identifying one or more of:
   capacities of fibers associated with the plurality of base stations,
   ownership of the fibers,
   costs associated with the fibers,
   geographical coordinates associated with the plurality of base stations, or
   fiber types of the fibers.

10. The device of claim 8, wherein the user equipment demands associated with the plurality of base stations include data identifying one or more of:
- throughput volumes of fibers associated with the plurality of base stations,
- speeds of the fibers,
- latencies associated with the fibers,
- jitters associated with the fibers, or
- availabilities of the fibers.

11. The device of claim 8, wherein the one or more processors are further configured to:
- determine thresholds for the excess backhaul capacities associated with the plurality of base stations based on utilizing a machine learning model with the user equipment demands and the backhaul capacity information.

12. The device of claim 8, wherein the one or more processors are further configured to:
- control the satellite antenna associated with the base station when establishing the satellite backhaul path for the satellite.

13. The device of claim 8, wherein the satellite backhaul path includes one or more fibers connecting the base station to a data network.

14. The device of claim 8, wherein the device is a multi-access edge computing device.

15. A non-transitory computer-readable medium storing a set of instructions, the set of instructions comprising:
- one or more instructions that, when executed by one or more processors of a device, cause the device to:
  - receive, from a satellite, a satellite backhaul demand associated with the satellite;
  - receive backhaul capacity information associated with a plurality of base stations, wherein none of the plurality of base stations is providing a satellite backhaul path for the satellite when the device receives the backhaul capacity information;
  - receive user equipment demands associated with the plurality of base stations;
  - calculate excess backhaul capacities associated with the plurality of base stations, based on the user equipment demands and the backhaul capacity information;
  - identify a base station, of the plurality of base stations, to provide a satellite backhaul path for the satellite, based on the excess backhaul capacities and the satellite backhaul demand;
  - provide, to the base station, a message instructing the base station to activate a satellite antenna associated with the base station;
  - provide, to the satellite, data identifying the base station;
  - establish the satellite backhaul path for the satellite, wherein the satellite backhaul path includes a direct path from the satellite to the base station; and
  - control the satellite antenna associated with the base station when establishing the satellite backhaul path for the satellite.

16. The non-transitory computer-readable medium of claim 15, wherein the satellite backhaul demand associated with the satellite is based on an aggregation of satellite fronthaul demands associated with the satellite.

17. The non-transitory computer-readable medium of claim 15, wherein the one or more instructions further cause the device to:
- cause satellite backhaul data to be provided from the satellite to a data network, via the satellite backhaul path, based on establishing the satellite backhaul path for the satellite.

18. The non-transitory computer-readable medium of claim 15, wherein the one or more instructions further cause the device to:
- identify at least one other base station, of the plurality of base stations, to provide at least one other satellite backhaul path for the satellite, based on the excess backhaul capacities and the satellite backhaul demand;
- provide, to the at least one other base station, a message instructing the at least one other base station to activate at least one satellite antenna associated with the at least one other base station;
- provide, to the satellite, data identifying the at least one other base station;
- establish at least one other satellite backhaul path for the satellite, via the at least one other base station;
- cause satellite backhaul data to be provided from the satellite to a data network, via the at least one other satellite backhaul path, based on establishing the at least one other satellite backhaul path for the satellite; and
- control the satellite antennas associated with the base station and the at least one other base station, and control communication between the base station and the at least one other base station.

19. The non-transitory computer-readable medium of claim 15, wherein the one or more instructions further cause the device to:
- determine thresholds for the excess backhaul capacities associated with the plurality of base stations based on utilizing a machine learning model with the user equipment demands and the backhaul capacity information.

20. The non-transitory computer-readable medium of claim 15, wherein the satellite backhaul path includes one or more fibers connecting the base station to a data network.

* * * * *